Nov. 25, 1952     W. H. CUTTINO     2,619,521
FORCED-AIR VENTILATING SYSTEM FOR ELECTRICAL DEVICES
Filed Dec. 17, 1949     2 SHEETS—SHEET 1

WITNESSES:

INVENTOR
William H. Cuttino.
BY
ATTORNEY

Nov. 25, 1952 W. H. CUTTINO 2,619,521
FORCED-AIR VENTILATING SYSTEM FOR ELECTRICAL DEVICES
Filed Dec. 17, 1949 2 SHEETS—SHEET 2

WITNESSES:
Robert A. Baird
W. G. Groome

INVENTOR
William H. Cuttino.
BY
ATTORNEY

Patented Nov. 25, 1952

2,619,521

UNITED STATES PATENT OFFICE 2,619,521

FORCED-AIR VENTILATING SYSTEM FOR ELECTRICAL DEVICES

William H. Cuttino, Pittsburgh, Pa., assignor to Westinghouse Electric Corporation, East Pittsburgh, Pa., a corporation of Pennsylvania Application December 17, 1949, Serial No. 133,519

8 Claims. (Cl. 175—294)

The present invention relates to forced-air ventilating systems and, more particularly, to forced-air ventilation of electrical devices enclosed in housings, such as capacitor banks or assemblies. The invention is especially applicable to housed capacitor banks, but it will be apparent that its usefulness is not restricted to this particular application, and that it is generally applicable to the ventilation of any enclosed, heat-producing electrical device.

Capacitor banks, such as are used for power factor correction on distribution or transmission lines, consist of a suitable number of individual capacitor units of standard kvar. rating, mounted in a rack and enclosed in a protective housing, which may be made weatherproof if the bank is intended for outdoor use. The losses in the capacitor units, which appear as heat, raise the temperature within the housing, and the heat must be adequately dissipated in order to keep the operating temperature of the capacitor units within the permissible limits. When relatively small capacitor units are used, the natural circulation of air through the housings is usually adequate to dissipate the heat and prevent excessive temperature rise of the capacitors. When larger capacitor units, such as 25 kvar. units, are used, however, in compact housed assemblies, the losses are concentrated in a relatively smaller volume, and the amount of heat generated is such that the natural air circulation through the housing is inadequate to prevent the operating temperature of the capacitor units from exceeding the permissible limits, if the outside or ambient air temperature is relatively high, as in warm weather. For this reason, it is necessary to provide forced-air ventilation for housed capacitor assemblies of this kind, to supplement the natural circulation of air under high ambient temperature conditions, in order to prevent excessively high temperatures within the housing.

The most desirable arrangement for providing forced-air circulation for equipment of this kind is to provide a plurality of motor-driven ventilating fans in the upper part of the housing, spaced apart longitudinally of the housing, and thermostatically controlled to turn the fans on when the temperature in the housing exceeds a predetermined value. With this arrangement, the circulation of air around and over the capacitor units is substantially equalized throughout the housing, both when the fans are running and when they are not running. With equalized circulation of the air, the cooling effect is the same in all parts of the housing, and the temperature will be substantially uniform throughout the housing, so that all the capacitor units will be adequately cooled. This arrangement also has the further distinct advantage that all the fans can be controlled by a single thermostat, thus permitting a relatively simple control system. In order to obtain this advantage, however, the fans must all be stopped and started simultaneously, and it must not be possible for one or more of the fans to stop while the others continue in operation. It is necessary to provide each fan motor with an overload protective device to protect the motor against damage, but if operation of one of the protective devices stops only its own fan motor, while the other fans continue to run, the advantage of equalized air circulation would be lost, and it would not be possible to control all the fans by a single thermostat.

The principal object of the present invention is to provide a forced-air ventilating system for housed electrical devices, such as capacitor assemblies, utilizing a plurality of fans aranged to provide equalized circulation of air through the housing and controlled by a single thermostat, the control means being arranged to effect simultaneous starting and stopping of all the fans.

Another object of the invention is to provide a forced-air ventilating system for housed electrical devices, using a plurality of motor-driven fans controlled by a single thermostat arranged to start and stop all the fans simultaneously, and in which each fan motor has its own protective device, the protective devices of all the motors being connected so that operation of any one of the protective devices causes deenergization of all of the fan motors, to stop all the fans simultaneously.

A more specific object of the invention is to provide a forced-air ventilating system for housed capacitor assemblies, or other enclosed electrical devices, utilizing a plurality of motor-driven fans arranged to produce substantially equalized circulation of air through the housing, and controlled by a single thermostat responsive to the temperature within the housing, which actuates a relay for simultaneously energizing all the fan motors to start the fans simultaneously, and in which each fan motor has its own overload protective device, and all the protective devices have their contacts connected in the circuit of the relay, so that operation of any one of the protective devices causes deenergization of all the motors and stopping of all the fans.

The invention will be more fully understood from the following detailed description, taken in connection with the accompanying drawings, in which.

Figure 1:
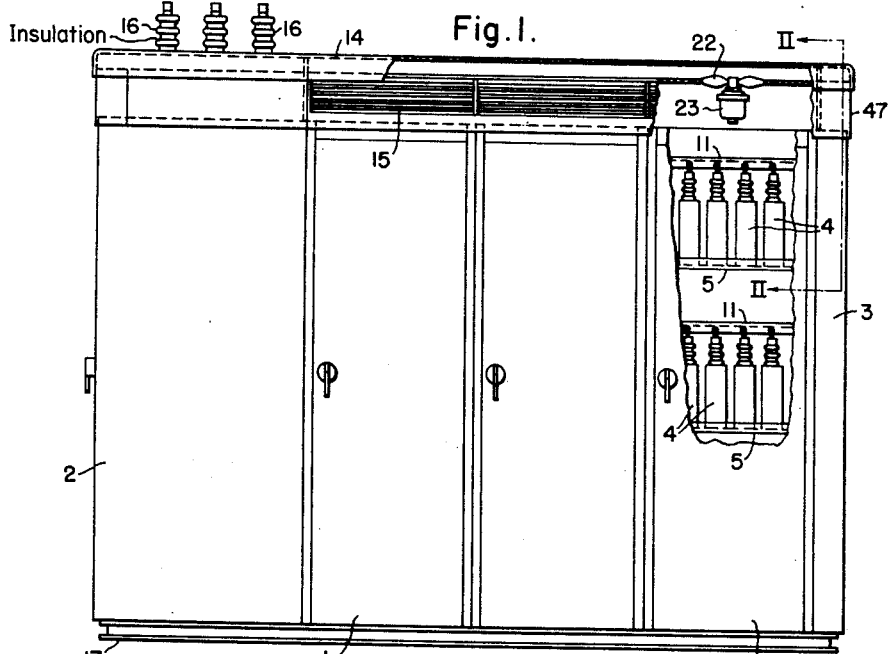
Figure 1 is a view in elevation of a housed capacitor bank, partly broken away to show the internal arrangement.
Figure 2:
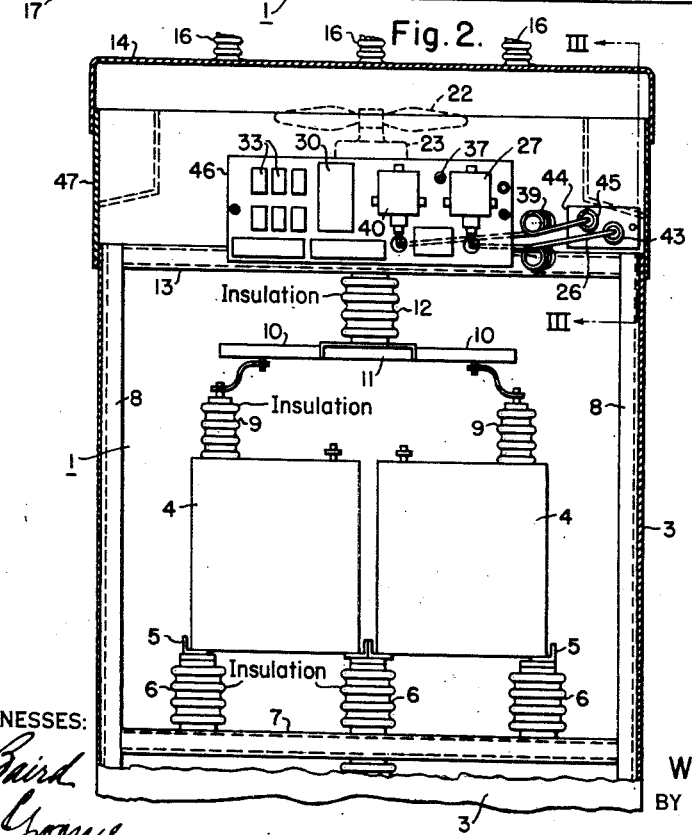
Fig. 2 is a transverse sectional view of the upper part of one end of the capacitor bank, on an enlarged scale, the section being taken approximately on the line II—II of Fig. 1.
Figure 3:
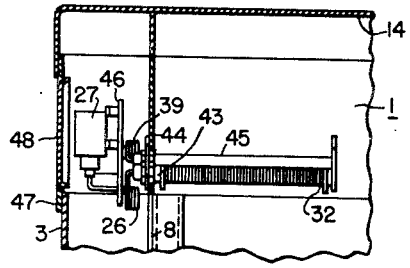
Fig. 3 is a fragmentary sectional view of the upper part of the end of the assembly, looking from the rear, the section being taken approximately on the line III—III of Fig. 2.

The invention is shown in the drawings applied to an enclosed rack-type capacitor bank or assembly intended for outdoor service, although it will be understood that the invention is applicable to other types of enclosed capacitor assemblies or, in general, to any enclosed heat-producing electrical device. The capacitor bank shown in the drawings is enclosed in a housing which comprises a plurality of capacitor compartments 1 and preferably also a circuit breaker compartment 2. The capacitor compartments 1 are open at the sides but enclosed at the front and back, and are provided with doors to permit access to the interior of the compartments. As many compartments are utilized as may be required, depending on the size of the bank and the number of capacitor units needed, and the individual compartments are assembled side by side, as shown, with the circuit breaker compartment 2 closing one end of the assembly. The other end of the assembly is closed by a sheet metal cover 3, so that the interior of the assembly is completely enclosed in a housing.

Each of the capacitor compartments 1 contains a suitable number of individual capacitor units 4 mounted in tiers on rails 5 extending longitudinally of the compartment and supported at the ends on insulators 6, which are mounted on transverse rails or structural members 7 extending between the vertical structural members 8 which form the framework of the compartment. The particular capacitor units 4 shown in the drawings are of the type having a single terminal bushing 9, and the capacitor units are connected through individual fuses 10 to a bus structure 11, which runs longitudinally through all the compartments 1 to the circuit breaker compartment 2, and which is supported by insulators 12 suspended from the upper structural members 13 of the compartments. It will be apparent that any desired type of capacitor units may be utilized, and that they may be connected together in any desired way in either a single-phase or a three-phase assembly. The top of the housing is closed by a roof structure 14, which includes louvers 15 at the top of each of the capacitor compartments to permit the discharge of air while excluding rain and snow from the interior. Entrance bushings 16 are mounted in the roof structure, and are preferably located over the circuit breaker compartment 2. It will be apparent that the construction described provides a housing completely enclosing the capacitor units 4, and the entire assembly may be mounted on rails 17, or other suitable supporting means, to permit the entrance of air through the bottom of the housing.

In the particular embodiment shown in the drawings, the capacitor units 4 are connected in a three-phase bank, and are connected to a three-phase line 18 through a circuit breaker 19, which is housed in the breaker compartment 2. The breaker 19 is shown as having a closing coil 20, which may be controlled either manually or automatically in any desired manner, and a trip coil 21, which is controlled automatically, as described hereinafter, and which may also be controlled manually or by any additional automatic means, if desired.

As previously explained, if the capacitor units 4 are of large size, the losses are concentrated within a relatively small space, and the natural air circulation through the housing is inadequate to prevent the temperature within the housing from rising above the permissible limit, if the outside or ambient air is at a high temperature, as on a warm summer day. In order to obtain adequate dissipation of the heat, therefore, and prevent excessive temperature rise of the capacitor units 4, forced-air ventilation is provided by means of a plurality of fans 22. The fans 22 are evenly spaced longitudinally of the housing, to obtain equalized circulation of the air, and in the preferred embodiment a fan is placed in the top of each of the capacitor compartments 1. The fans draw in air through the bottom of the housing and discharge it through the louvers 15 at the top, to provide forced circulation of air between and over the capacitor units 4 to dissipate the heat generated in them. The fans 22 are driven by individual motors 23, which are preferably single-phase motors, and which are connected in parallel to any suitable source of low-voltage, single-phase power, which may be obtained, for example, from a transformer 24 connected across one phase of the line 18.

The fan motors 23 are controlled by means of a thermostat 25 placed within one of the capacitor compartments to be responsive to the temperature within the housing. The thermostat 25 may be of any suitable type, and is shown as being a bulb-type thermostat, having a bulb containing a volatile fluid and connected by tubing 26 to a temperature control relay 27. The relay has a normally open contact 28 which is adapted to be closed in response to expansion of the volatile fluid in the thermostat bulb when the temperature of the bulb exceeds a predetermined value for which the relay 27 is set. The contact 28 of the temperature control relay 27 is connected in series with the operating coil 29 of a relay 30 for controlling the fan motors 23. The relay 30 has a normally open contact 31 connected in the energizing circuit of the motors 23, so that when the contact 31 closes the motors are all simultaneously energized. A heater 32 is preferably associated with the thermostat 25, and is connected in parallel with the motors 23 so as to be energized simultaneously with the motors. The purpose of the heater 32 is to raise the temperature of the thermostat 25 when the fans are started in operation, so as to keep them running continuously until the outside air temperature has dropped below the temperature which initially caused an excessive temperature in the housing and caused the thermostat to operate, thus preventing too frequent starting and stopping of the motors, as more fully described and claimed in a copending application of R. E. Marbury, Serial No. 133,568 filed December 17, 1949, and assigned to Westinghouse Electric Corporation.

Each of the fan motors 23 is provided with a thermal overload protective device 33. As shown diagrammatically in Fig. 4, each of the protective devices 33 includes a heater 34, which is connected in series with the motor, or otherwise connected to be responsive to the motor current, and a set of contacts 35 actuated by a thermostat 36 which is responsive to the heat produced by the heater 34, and thus to the motor current. This type of thermal protective device is well known in itself, and any suitable type of protective device may be utilized which is adapted to open its contacts in response to excessive motor current, or other abnormal condition, indicating an overload or other condition which may damage the motor. The contacts 35 of the protective devices 33 are not connected individually in series with the respective motors, as in the conventional arrangement, but are connected in series with each other, and with the contact 28 of the temperature control relay 27, to the coil 29 of the relay 30, so that the contacts 35 are connected in the control circuit for energizing the fan motors 23.

Figure 4:
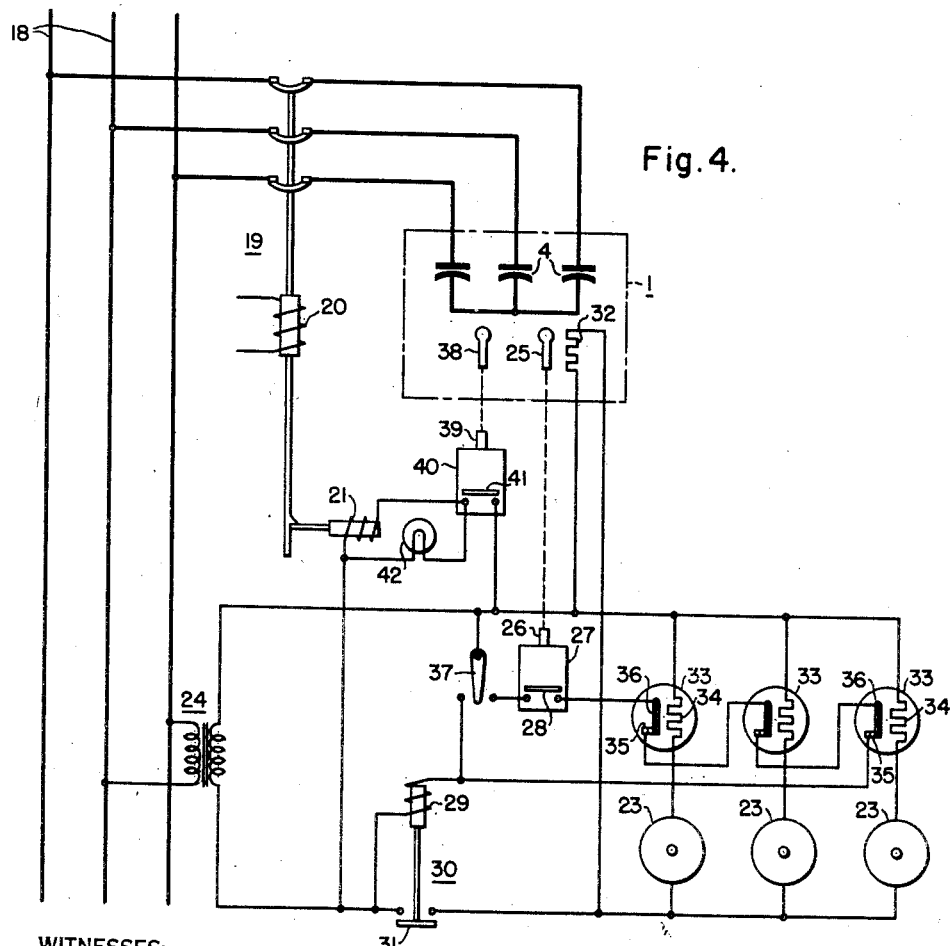
Fig. 4 is a schematic wiring diagram showing the control circuit for the ventilating system.

A manual transfer switch 37 is preferably provided to permit manual operation of the fan motors. The switch 37 has two operating positions, as shown in Fig. 4. When the switch 37 is placed on the right-hand contact, the coil 29 of the relay 30 is connected across the transformer 24 through the contacts 35 of the protective devices 33 and the contact 28 of the temperature control relay 27, so that the system is set for automatic operation. When the transfer switch 37 is placed on the left-hand contact, the coil 29 is connected directly across the transformer 24, so that the fan motors 23 are directly energized and are not under the control of the thermostat 25.

Backup protection is preferably also provided for the capacitor bank by means of a second thermostat 38. The thermostat 38 is also shown as being a bulb-type thermostat connected by tubing 39 to a second temperature control relay 40 having a normally open contact 41 which is adapted to be closed in response to expansion of the fluid in the bulb 38 when the temperature of the bulb exceeds the setting of the relay 40, which is preferably made somewhat higher than the setting of the temperature control relay 27. The contact 41 of the relay 40 is connected in series with the trip coil 21 of the circuit breaker 19 across the transformer 24, to energize the trip coil when the contact 41 closes. A signal device 42 is preferably connected in parallel with the trip coil 21 to be energized simultaneously therewith. The signal device 42 has been shown as a lamp, but it will be understood that it may be any suitable type of alarm adapted to give either a visual or an audible warning signal to indicate that the contact 41 has closed and tripped the breaker 19.

The thermostats 25 and 38 are disposed within the housing so as to be responsive to the temperature therein. Preferably, the thermostat 25 is mounted in a well 43, which may consist of a suitable length of metal tubing, mounted on a plate 44 secured in the upper part of the end capacitor compartment 1, so as to extend into the interior of the housing. The heater 32 may consist of a suitable length of resistance wire wound directly on the well 43. The thermostat 38 may be similarly disposed in a second well 45, also mounted on the plate 44 adjacent the well 43. The temperature control relays 27 and 40, the relay 30, and the protective devices 33 may conveniently be mounted on a control panel 46 located in the upper part of the end capacitor compartment, and which may also carry any other necessary or desirable protective or control devices, such as the transfer switch 37. The panel 46 is preferably enclosed by a cover 47 which may have a removable door 48 to permit access to the panel.

The operation of this system is as follows. Assuming that the transfer switch 37 is set for automatic operation, that is, on the right-hand contact in Fig. 4, if the temperature within the housing exceeds the value for which the temperature control relay 27 is set, the thermostat 25 causes the relay 27 to close its contact 28, thus connecting the coil 29 of the relay 30 across the transformer 24. The relay 30 is thus actuated to close its contact 31 and simultaneously energize all the fan motors 23 to start the fans in operation and induce a rapid circulation of outside air through the housing. The heater 32 is simultaneously energized to somewhat raise the temperature of the thermostat 25, so that the fans will continue in operation even when the heated air in the housing has been completely replaced by the cooler outside air, which will normally occur within a few minutes. When the temperature within the housing has dropped to a sufficiently low temperature, indicating that the outside air has cooled substantially below the temperature which originally resulted in the excessive temperature in the housing, so that forced ventilation is no longer needed, the relay 27 opens its contact 28, deenergizing the relay 30, so that it opens its contact 31 and simultaneously stops all the fan motors.

If an overload, or other abnormal condition, occurs in any of the motors 23 during operation, the increased motor current will cause operation of the protective device 33 associated with that particular motor to open the contacts 35 of the protective device. Since the contacts of all the protective devices are connected in series, operation of any one of them will interrupt the series circuit, which includes the coil 29 of the relay 30, so that the relay 30 will be deenergized and will drop out to stop all the fan motors. Thus, operation of any one of the protective devices 33 causes simultaneous deenergization of all the fan motors. If the temperature in the housing exceeds the permissible maximum, either with or without the fan motors in operation, the capacitors 4 may be damaged, and the backup thermostat 38 is provided for protection against such damage. If the temperature in the housing exceeds the predetermined maximum for which the temperature control relay 40 is set, which is made somewhat higher than the setting of the relay 27, either because of failure of one of the fan motors, or for any other reason, the thermostat 38 causes the relay 40 to close its contact 41 to energize the trip coil 21 of the breaker 19 and thus disconnect the capacitor bank from the line, the signal 42 being simultaneously energized to indicate that the breaker has been tripped. It will be understood, of course, that the signal 42 might be omitted, if desired, or that a signal device alone might be used without tripping the breaker, if the conditions of a particular installation make it desirable.

It should now be apparent that a forced-air ventilating system has been provided for housed capacitor banks, or other enclosed electrical devices, in which substantially equalized circulation of the air is ensured, so that the ventilating system can be controlled by a single thermostat responsive to the temperature within the housing. This result is obtained by providing means for starting and stopping all the fan motors simultaneously and for making it impossible for one motor to be stopped by its protective device while the others continue in operation.

It will be obvious that various modifications and other embodiments of the invention are possible, and it is to be understood, therefore, that the invention is not limited to the specific arrangement and details of construction shown and described for the purpose of illustration, but that in its broadest aspects it includes all equivalent embodiments and modifications which come within the scope of the appended claims.

I claim as my invention:

1. In combination, a housing, a heat-producing electrical device enclosed in said housing, a plurality of ventilating fans for effecting circulation of cooling air through the housing, said fans being disposed in the housing to provide substantially uniform circulation of air throughout the housing, a driving motor for each of said fans, a protective device associated with each of said motors, a temperature-responsive device in the housing for controlling the operation of all of the fans, relay means actuated by said temperature-responsive device and connected to effect simultaneous energization and deenergization of all of the fan motors, and means connecting said protective devices to said relay means to effect deenergization of all of the motors upon operation of any one of the protective devices.

2. In combination, a housing, a heat-producing electrical device enclosed in said housing, a plurality of ventilating fans for effecting circulation of cooling air through the housing, said fans being disposed in the housing to provide substantially uniform circulation of air throughout the housing, a driving motor for each of said fans, a protective device associated with each of said motors, a first temperature-responsive device in the housing for controlling the operation of all of the fans, relay means actuated by said first temperature-responsive device and connected to effect simultaneous energization and deenergization of all of the fan motors, means connecting said protective devices to said relay means to effect deenergization of all of the motors upon operation of any one of the protective devices, a second temperature-responsive device in the housing, and means actuated by said second temperature-responsive device for effecting deenergization of the electrical device when the temperature in the housing exceeds a predetermined maximum.

3. A forced-ventilated capacitor assembly comprising a housing, a plurality of capacitor units mounted in the housing, a plurality of fans in the housing for effecting circulation of cooling air through the housing, said fans being disposed in the housing to provide substantially uniform circulation of air throughout the housing, a driving motor for each of said fans, a protective device associated with each of said motors, a temperature-responsive device in the housing for controlling the operation of all of the fan motors, control means actuated by said temperature-responsive device and connected to effect simultaneous energization and deenergization of the motors, and means connecting said protective devices to said control means to effect deenergization of all of the motors upon operation of any one of the protective devices.

4. A forced-ventilated capacitor assembly comprising a housing, a plurality of capacitor units mounted in the housing, a plurality of fans in the housing for effecting circulation of cooling air through the housing, said fans being disposed in the housing to provide substantially uniform circulation of air throughout the housing, a driving motor for each of said fans, a protective device associated with each of said motors, a first temperature-responsive device in the housing for controlling the operation of all of the fan motors, control means actuated by said first temperature-responsive device and connected to effect simultaneous energization and deenergization of the motors, means connecting said protective devices to said control means to effect deenergization of all the motors upon operation of any one of said protective devices, a second temperature-responsive device in the housing, and means actuated by said second temperature-responsive device for effecting deenergization of the capacitor assembly when the temperature in the housing exceeds a predetermined maximum.

5. A forced-ventilated capacitor assembly comprising a housing, a plurality of capacitor units mounted in the housing, a plurality of fans in the housing for effecting circulation of cooling air through the housing, said fans being disposed in the housing to provide substantially uniform circulation of air throughout the housing, a driving motor for each of said fans, a protective device associated with each of said motors, a temperature-responsive device in the housing for controlling the operation of all of the fan motors, control means actuated by said temperature-responsive device, said control means including a control circuit connected to effect simultaneous energization and deenergization of the motors, said protective devices having contacts connected in said control circuit for the fan motors, the contacts of all the protective devices being connected in series, whereby operation of any one of the protective devices effects deenergization of all the motors.

6. A forced-ventilated capacitor assembly comprising a housing, a plurality of capacitor units mounted in the housing, a plurality of fans in the housing for effecting circulation of cooling air through the housing, said fans being disposed in the housing to provide substantially uniform circulation of air throughout the housing, a driving motor for each of said fans, a protective device associated with each of said motors, a first temperature-responsive device in the housing for controlling the operation of all of the fan motors, control means actuated by said first temperature-responsive device, said control means including a control circuit connected to effect simultaneous energization and deenergization of the motors, said protective devices having contacts connected in said control circuit for the fan motors, the contacts of all the protective devices being connected in series, whereby operation of any one of the protective devices effects deenergization of all the motors, a second temperature-responsive device in the housing, and means actuated by said second temperature-responsive device for effecting deenergization of the capacitor assembly when the temperature in the housing exceeds a predetermined maximum.

7. A forced-ventilated capacitor assembly comprising a housing, a plurality of capacitor units mounted in the housing, a plurality of fans in the housing for effecting circulation of cooling air through the housing, said fans being disposed in the housing to provide substantially uniform circulation of air throughout the housing, a driving motor for each of said fans, a relay connected to control the energization of all of the fan motors, a temperature-responsive device in the housing, control means actuated by said temperature-responsive device to control an energizing circuit for said relay to effect simultaneous starting and stopping of the fan motors, and a protective device associated with each of said motors, said protective devices having contacts connected in series in the energizing circuit for the relay, whereby operation of any one of the protective devices effects deenergization of all the motors.

8. A forced-ventilated capacitor assembly comprising a housing, a plurality of capacitor units mounted in the housing, a plurality of fans in the housing for effecting circulation of cooling air through the housing, said fans being disposed in the housing to provide substantially uniform circulation of air throughout the housing, a driving motor for each of said fans, a relay connected to control the energization of all of the fan motors, a first temperature-responsive device in the housing, control means actuated by said temperature-responsive device to control an energizing circuit for said relay to effect simultaneous starting and stopping of the fan motors, a protective device associated with each of said motors, said protective devices having contacts connected in series in the energizing circuit for the relay, whereby operation of any one of the protective devices effects deenergization of all the motors, a second temperature-responsive device in the housing, and means actuated by said second temperature-responsive device for effecting deenergization of the capacitor assembly when the temperature in the housing exceeds a predetermined maximum.

WILLIAM H. CUTTINO.

REFERENCES CITED

The following references are of record in the file of this patent:

UNITED STATES PATENTS

| Number | Name | Date |
| --- | --- | --- |
| 1,453,492 | Connely | May 1, 1923 |
| 1,630,214 | Pfretzschner | May 24, 1927 |
| 2,302,395 | Seaman | Nov. 17, 1942 |
| 2,364,881 | Tyrner | Dec. 12, 1944 |
| 2,480,538 | Barr | Aug. 30, 1949 |